(12) United States Patent
Gaffigan (10) Patent No.: US 11,491,600 B2
(45) Date of Patent: Nov. 8, 2022

(54) SYSTEM AND METHOD FOR ON DEMAND PILL CANISTER PRODUCTION

(71) Applicant: In Touch Pharmaceuticals, Inc., Valparaiso, IN (US)

(72) Inventor: Richard Mitch Gaffigan, Chesterton, IN (US)

(73) Assignee: In Touch Pharmaceuticals, Inc., Valparaiso, IN (US)

( * ) Notice: Subject to any disclaimer, the term of this patent is extended or adjusted under 35 U.S.C. 154(b) by 171 days.

(21) Appl. No.: 17/248,746

(22) Filed: Feb. 5, 2021

(65) Prior Publication Data

US 2021/0252658 A1 Aug. 19, 2021

Related U.S. Application Data

(60) Provisional application No. 62/976,564, filed on Feb. 14, 2020.

(51) Int. Cl.
| | | |
|---|---|---|
| *B33Y 50/02* | (2015.01) | |
| *B23Q 15/12* | (2006.01) | |
| *B33Y 30/00* | (2015.01) | |
| *B29C 64/393* | (2017.01) | |
| *B23C 3/16* | (2006.01) | |

(Continued)

(52) U.S. Cl.
CPC .......... *B23Q 15/12* (2013.01); *B23C 3/16* (2013.01); *B29C 64/393* (2017.08); *B33Y 30/00* (2014.12); *B33Y 50/02* (2014.12); *G05B 19/4099* (2013.01); *B29L 2031/712* (2013.01); *B33Y 80/00* (2014.12); *G05B 2219/35134* (2013.01); *G05B 2219/45145* (2013.01)

(58) Field of Classification Search
CPC ..................................................... B33Y 50/02
See application file for complete search history.

(56) References Cited

U.S. PATENT DOCUMENTS

| | | |
|---|---|---|
| 6,792,736 B1 | 9/2004 | Takahashi et al. |
| 8,666,543 B2 | 3/2014 | MacVittie et al. |
| (Continued) | | |

FOREIGN PATENT DOCUMENTS

| | | | |
|---|---|---|---|
| JP | 2012203894 A | * | 10/2012 |
| JP | 6029061 B2 | | 11/2016 |
| (Continued) | | | |

OTHER PUBLICATIONS

Thimmesch, 3D Printed, Automated Medication Dispenser Provides Patients & Caregivers Peace of Mind, Aug. 13, 2015, p. 4 (Year: 2015).*

(Continued)

*Primary Examiner* — Suresh Suryawanshi
(74) *Attorney, Agent, or Firm* — Woodard, Emhardt, Henry, Reeves & Wagner, LLP (57) ABSTRACT

The present invention is a rapid pill canister adapter production system which provides a machine which will accept as input the details of a certain pill or tablet, such as its shape, size, weight and the like and produce a part for use within the pill canister of an automatic pill dispenser to properly line up the pills for dispensing. Once designed and verified, the device would rapidly produce the part for immediate use by the pharmacy. This would enable pharmacies to install new medications into their automatic pill dispensers with very minimal delay.

20 Claims, 5 Drawing Sheets

(51) Int. Cl.
  *G05B 19/4099* (2006.01)
  *B33Y 80/00* (2015.01)
  *B29L 31/00* (2006.01)

(56) References Cited

U.S. PATENT DOCUMENTS

| | | |
|---|---|---|
| 10,093,474 B2 | 10/2018 | Littman et al. |
| 2005/0251275 A1 | 11/2005 | Carlson |
| 2007/0102109 A1* | 5/2007 | Katritzky ............. B65G 1/1376 |
| | | 156/212 |
| 2010/0031611 A1 | 2/2010 | Ali et al. |
| 2013/0151005 A1 | 6/2013 | Gerold et al. |
| 2013/0193621 A1* | 8/2013 | Daya ...................... B33Y 30/00 |
| | | 425/130 |
| 2018/0353308 A1* | 12/2018 | Tompkins ............... A61F 2/585 |
| 2019/0117584 A1 | 4/2019 | Daya et al. |

FOREIGN PATENT DOCUMENTS

| | | | |
|---|---|---|---|
| KR | 10-2018-0108621 A | 10/2018 | |
| WO | WO-2020145898 A1 * | 7/2020 | ................ A61J 3/06 |

OTHER PUBLICATIONS

Written Opinion and Search Report from PCT application No. PCT/US2021/017090 dated May 27, 2021, 9 pages.

\* cited by examiner

SYSTEM AND METHOD FOR ON DEMAND PILL CANISTER PRODUCTION

CROSS REFERENCE TO RELATED APPLICATIONS

This application claims the benefit of U.S. Provisional Application No. 62/976,564 filed Feb. 14, 2020, the content of which is hereby incorporated by reference to the extend not inconsistent.

FIELD OF THE INVENTION

The present invention generally relates to a system and method for the on demand design and production of pill canister adapters for use in automated pharmaceutical dispensing and order fulfillment. More particularly, the present invention relates to a system and method for receiving input parameters regarding the pill to be dispensed, designing a pill canister for reliably dispensing the pill and thereafter enabling the production of that pill canister for prompt usage in an automated pharmaceutical dispensing machine.

BACKGROUND OF THE INVENTION

Pharmacies in the United Stated have evolved significantly from the traditional counter located within a drug store. Pharmacies have taken on a number of different forms in addition to these retail locations. For example, in an effort to reduce costs, many health insurers recommend, encourage or require their participants to utilize approved online or mail-order pharmacies for fulfilling recurring prescriptions. Additionally, specialized closed door pharmacies exists for fulfilling prescriptions for health care facilities such as assisted living facilities, hospices, correctional facilities, and the like. These pharmacies are often referred to as short-cycle pharmacies as they dispense medication to be used over a period of less than fourteen (14) days pursuant to regulations. Often time these periods can be as few as a few days.

In order to fulfill large batches of prescriptions, remote pharmacies typically utilize some level of pharmacy automation systems in order to (1) control access to the pharmaceuticals (2) reduce operating costs and (3) improve accuracy and efficiency. Pharmacy automation is the automation of tasks performed in pharmacy or other health care settings. Any pharmacy task can be involved, including counting small objects (e.g., tablets, capsules); tracking and updating customer information in databases (e.g., personally identifiable information (PII), medical history, drug interaction risk detection), medication labeling and packaging, verification, and inventory management.

While much advancement has been made in the speed, reliability and accuracy of pharmacy automation systems, they have traditionally relied upon specialized parts, commonly known as pill canisters, in order to be readily adapted for accurately dispensing a given medication. These typically include a pill canister body or housing and a pill canister adapter, which customizes the pill canister for a given type of pill. These machines may output to fill medication punch cards, vials, strips or the like. Different medications have different constructions and dimensions, including tablets, capsules and other forms, all of which can vary in size. In the past, when preparing to stock and fulfill a new medication, automated pharmacies had to order a special pill canister adapter from the manufacturer who supplied them with their selected pharmacy automation equipment. In ideal situations, these canisters were available prior to the medication being received for fulfillment. However, often times there are delays at the manufacturer, especially for less popular medications, or delays and/or oversights occur at the pharmacy in ordering the canister sufficiently early to ensure its timely arrival. Moreover, pharmacies sometimes break, lose or otherwise need to replace or obtain an additional pill canister adapters for a selected medication. When this happens, time is require to order and receive the desired pill canister adapter. In addition, the costs for these canisters and their expedited delivery are often substantial. It shall be appreciated that the term pill shall be used herein to collectively refer to all forms of pills, tablets, and other medications and that the term pill canister shall refer to the containers used in automated pharmaceutical dispensing systems for storing these pills prior to dispensation. The term pill canister adapter shall refer to the customizable portion of the pill canister which renders its suitable for use with a selected pill or pill size and shape.

In the field of order fulfillment, the failure to have an appropriate canister for dispensing a medication often equates to simply being out of stock of the medication. While hand filling can sometimes be done when necessary, there is a need for better method of sourcing canisters on demand. The present invention solves a number of these problems as well as other problems present in the pharmaceutical fulfillment industry, and applies them to the automated fulfillment of pharmaceutical orders, as illustrated in the descriptions that follow.

SUMMARY OF THE INVENTION

Various technologies and techniques are disclosed for optimizing the process for equipping automated processing machinery for use in fulfilling pharmaceutical orders. In one embodiment, a three-dimension design system is provided which takes as inputs various parameters regarding the size, shape and dimensions of a selected pharmaceutical, medication or pill. Using various logic and information, a suitable pill canister adapter is designed based upon known criteria associated with various commercially available automated pharmaceutical dispensing systems. The design necessarily includes a set of grooves, leads, baffles, separators or the like to align the pills from a bulk free flowing supply within the canister into an orderly and predictable flow to a desired opening for the specified machine. The resulting pill canister adapter model, or the specifications thereof, is provided to a three-dimensional milling machine or other suitable rapid production device, such as a three-dimensional printer. A blank canister is then loaded into the machine for processing into a pill canister adapter matching the determined model. This pill canister adapter may then be removed and is suitable for use within the specified automated pharmaceutical dispensing system for dispensing the specified pill.

This summary is provided to introduce a selection of concepts in a simplified form that are described in further detail in the detailed description and drawings contained herein. This Summary is not intended to identify key features or essential features of the claimed subject matter, nor is it intended to be used as an aid in determining the scope of the claimed subject matter. Yet other forms, embodiments, objects, advantages, benefits, features, and aspects of the present invention will become apparent from the detailed description and drawings contained herein.

DETAILED DESCRIPTION OF THE SPECIFIC EMBODIMENTS

For the purposes of promoting and understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Nearly four and a half billion prescriptions are filled annually in the United States. In some instances, individual patients are on a dozen or more prescription medications at the same time. Often times the patients on the most concurrent medications are living within assisted living facilities, such as a hospice, retirement home or the like. As a result, these facilities have a growing need for the accurate and timely dispensing of prescription medication. Further, given the volume of pharmaceuticals needed, competition for the business of these facilities is fierce, which further drives down costs and margins. Accordingly, all steps in the pharmaceutical dispensing process must be optimized in order to provide competitive pricing.

Currently, various systems exist which improve the speed and accuracy of pharmaceutical dispensing by automating the process. However, further improvements and cost savings could be obtained by optimizing the availability of medication specific components for these commercially available automated pharmaceutical dispensing systems. Accordingly, a representative system and method for enabling the on demand design and production of a pill canister adapter for a given pharmaceutical, medication and/or pill and a specified pharmaceutical dispensing system will be described. It shall be appreciated that many components of the system may be replaced with other components of comparable function (including manual and automated, or a combination thereof) without departing from the scope of the invention. Furthermore, while bulk pharmaceutical distributors, such as the pharmacies which serve assisted living facilities and the like, may be the first adopters of pharmacy automation such as that described herein, it shall be appreciated that the disclosed system and methods are equally applicable in other settings, including retail pharmacies, hospitals and the like.

Figure 1:
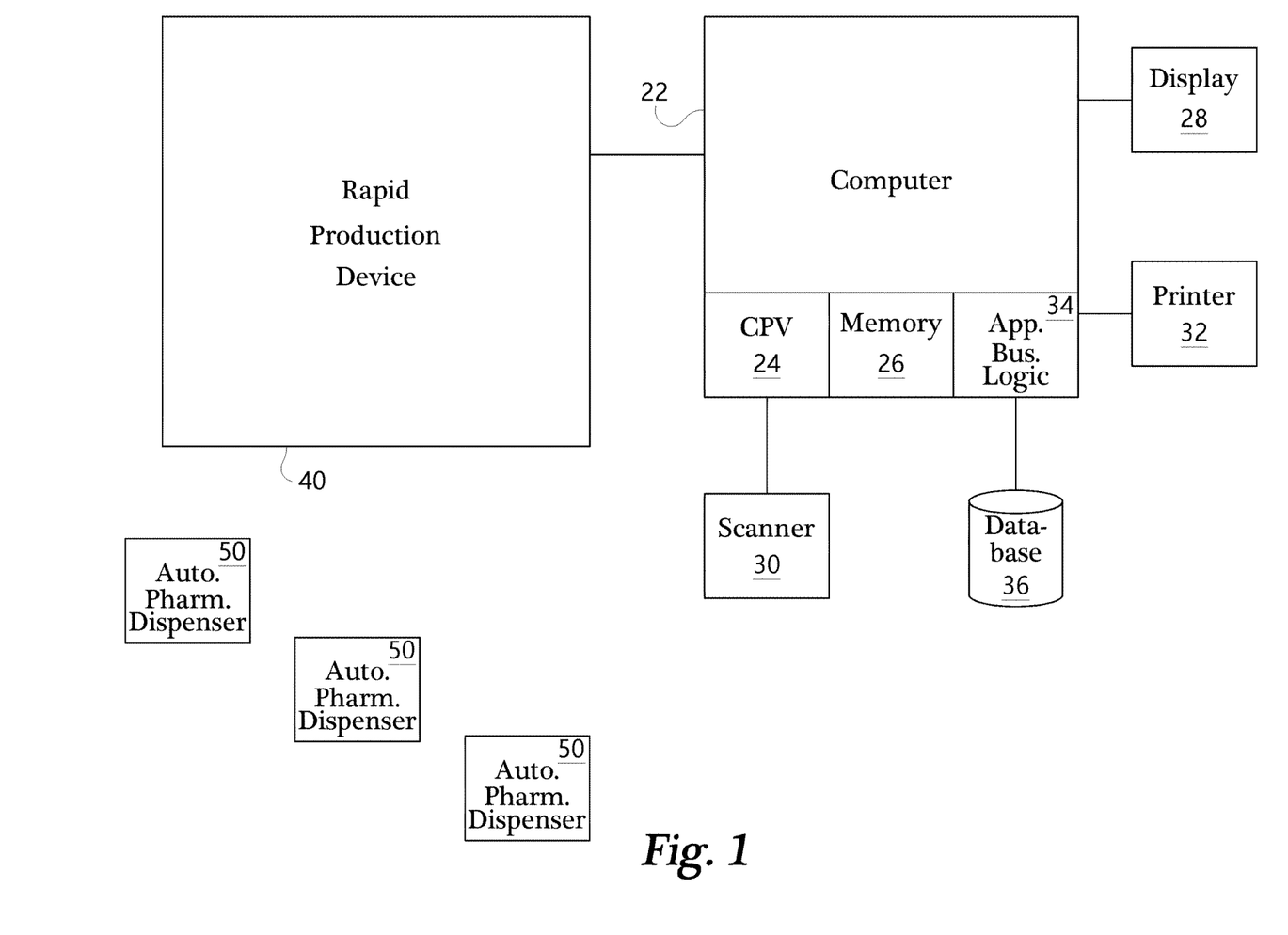
FIG. 1 is a diagrammatic view of a computer system of one implementation of the present invention.

FIG. 1 is a diagrammatic view of a rapid pill canister adapter design and development system 20 of one embodiment of the present invention. According to this embodiment, one or more computers 22 are provided (with only one being illustrated for ease of illustration) along with a rapid production device 40, which is operably connected to at least one of the computers 22. The connection may be via wired or wireless connection, such as USB, LAN, Bluetooth® or the like, or by other known forms of sharing data, such as a USB thumb drive or other transferrable electronic media. It shall be appreciated that one or more of the computers 22 may alternatively be combined with the rapid development production device 24 to form a specialized and/or dedicated unit. It shall also be appreciated that one or more automated pharmaceutical dispensing systems 50 for which the system 20 may be utilized are shown in FIG. 1, but that these devices do not form a necessary component of the actual system 20.

In the illustrated form, the one or more computers 22 may be one of many forms of computers, such as a desktop, workstation, laptop, all-in-one, tablet, mobile phone or the like. Computers 22 also include one or more processors or CPUs 24 and one or more types of memory 26. Each memory 26 preferably includes a removable memory device. Each processor 24 may be comprised of one or more components configured as a single unit. When of a multi-component form, a processor 24 may have one or more components located remotely relative to the others. One or more components of each processor 24 may be of the electronic variety defining digital circuitry, analog circuitry, or both. In one embodiment, each processor 24 is of a conventional, integrated circuit microprocessor arrangement, such as one or more RYZEN processors supplied by ADVANCED MICRO DEVICES Corporation of One AMD Place, Sunnyvale, Calif. 94088, USA. Each memory 26 (removable, fixed or both) is one form of a computer-readable device. Each memory may include one or more types of solid-state electronic memory, magnetic memory, or optical memory, just to name a few.

Although not shown (to preserve clarity), one or more of computers 22 may be coupled to a display and/or may include an integrated display 28. Computers 22 may be of the same type, or a heterogeneous combination of different computing devices. Likewise, displays may be of the same type, or a heterogeneous combination of different visual devices. Although again not shown to preserve clarity, each computer 22 may also include one or more operator input devices such as a keyboard, mouse, track ball, light pen, touch screen and/or microtelecommunicator, to name just a few representative examples. Computer 22 also includes an additional input scanner 30, such as a camera, barcode reader or QR code reader. Also, besides a display 28, one or more other output devices may be included such as a loudspeaker or printer 32. Various display and input device arrangements are possible. In the illustrated form, the computers 22 are laptop computers. In a further form, the laptop computers each include touchscreen displays 28. In an alternate embodiment, one or more of computers 22 may be mobile devices, such as a mobile device utilizing the iOS, Android, or any other operating system. This specifically includes iPhones and iPads (manufactured by Apple, Inc., located at 1 Infinite Loop Cupertino, Calif. 95014), Fire Tablets (manufactured by Amazon.com, Inc., located at 1200 12th Avenue South, Suite 1200, Seattle, Wash. 98144-2734), Android phones/tablets (manufactured by various manufacturers), and other similar devices.

In the illustrated embodiment, application business logic 34 for collecting information regarding a pill to be dispensed and determining the proper design for a pill canister adapter based upon inputs regarding the size and shape of the pill to be dispensed is installed locally or otherwise accessible on at least one of computers 22. Application business logic 34 is further operable to communicate the resulting design to the rapid production device 40 and/or control the rapid production device 40 (in whole or in part) to produce the part as designed. This may include translating the three-dimension design into a set of movements utilizing one or more specified milling heads to convert a standard known blank into the design desired or movements and extrusions to be carried out by a three-dimensional printing device. Application business logic 34 may be an installable application, optionally including CAD software as well as a tool path generator, a cloud-based service, a mobile application or the like.

In order to arrive at the required design for a pill canister adapter, application business logic 34 receives input from a user or otherwise regarding the pill to be dispensed by the pill canister. In one form, this input includes the shape, length, width and height of the pill. Alternatively or additionally, the information input into application business logic 34 may include an identification of the pill, such as by input to scanner 30 of a barcode, QR code (or the like) or just an intelligent processing of an image of the pill which recognizes it from its size, shape and/or required markings or which utilized image or other scanning techniques to automatically determine the shape and dimensions of the pill.

In the illustrated form, as will be described herein with respect to FIG. 2, application business logic 34 provides visual displays, such as via display 28, to prompt the user for input regarding the data required to be input as well as instructions for completing the process of producing a pill canister adapter for use in dispensing a given pill. Also resident in or accessible to at least one of computers 22 is a database 36 of pill dimensions and criteria for use in designing a usable pill canister adapter. In other forms, the database may alternatively or additional include design plans usable for dispensing the identified pill. These designs may be published by the pill's provider, by the manufacturer of one or more automated pharmaceutical dispensing systems, or by the provider or other users of system 20 and are preferably updated periodically as new medications are released and other forms perhaps revised. Database 36 may be a private database stored locally or at a remote server which is accessed over the Internet or it may also be a public server accessible and shared by numerous end users.

Rapid production device 40 may be, in certain embodiments, a 3-D printer, a stereolithographic printer, a milling machine or a computer numerical control device, sometimes referred to as "CNC" machines. One example of a device suitable for use as rapid production device 24 is the Pocket NC 5-Axis CNC Milling Machine available from Pocket NC (www.pocketnc.com). However, it shall be appreciated that in one form the rapid production device 40 is purpose built and, in a further form, may integrate one or more components of system 20 in a single device, such as combination of rapid production device 40 and scanner 30.

Turning now to automated pharmaceutical dispensing systems 50, shown with the illustrated embodiment are one or more automated pharmaceutical dispensing systems 50 which serve to automatically dispense and package unit doses of selected pharmaceuticals as instructed by an associated pharmacy information system (not shown). Automated pharmaceutical dispensing systems 50 provide for the safe, secure, automated storage and retrieval of pharmaceutics. Many of these devices do not require human intervention when the necessary pharmaceuticals are currently within the stored inventory, but may require manual intervention to provide additional pharmaceuticals at times.

In one form, these pharmaceutical dispensing systems 50 contain an inventory of robotically retrievable smart containers stored within their secure outer housing. The individual containers are each aware of the medication contained therein and maintain an accurate count regarding the quantity of that medication they contain. From this information, records may be kept as to the current quantity of each pharmaceutical contained therein, its expiration, and the amount of each pharmaceutical removed by each user and when it was removed. Further, these containers have a serialization mechanism at their base which enables them to automatically dispense a desired amount of medication upon retrieval and activation, which includes a pill container. An exemplary automated pharmaceutical dispensing systems is the RxSafe 1800 currently sold by RxSafe, LLC—located at 800 N. Twin Oaks Valley Rd. Suite 101, San Marcos, Calif. 92069. Other sources include JVM, Tosho, Sanyo, Panasonic and PHCHD. It shall be appreciated that system 20 may function for the purposes of enabling the efficient and timely operation of one or more automated pharmaceutical dispensing systems 50.

Figure 2:
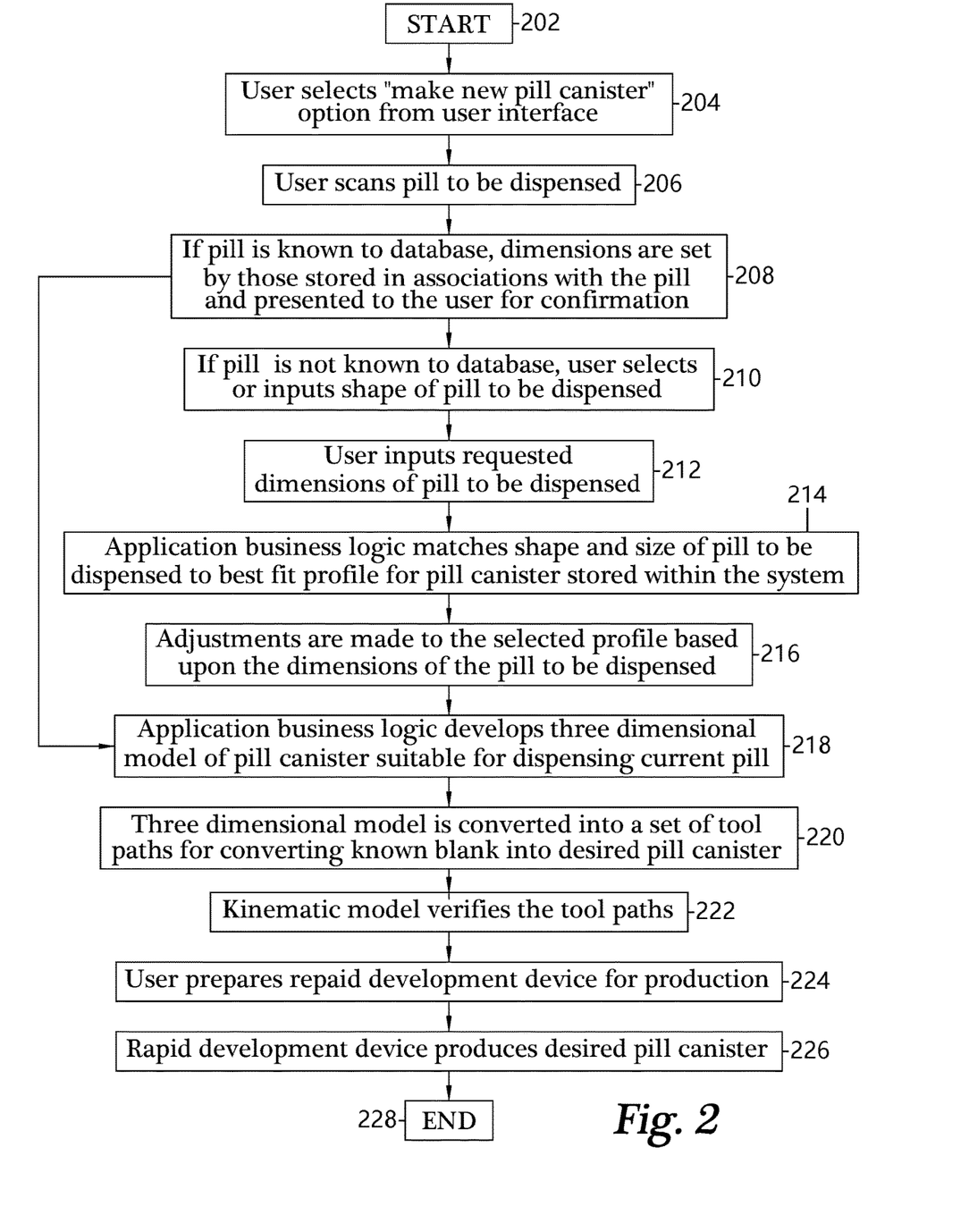
FIG. 2 is a process flow diagram demonstrating one example of the steps involved in receiving, verifying, and processing the design for a pill canister adapter for use with a specified pill in one embodiment of the present system and method illustrated in FIG. 1.

Turning to FIG. 2, with continued reference to FIG. 1, a flowchart illustrating the process 200 of designing and producing a pill canister adapter for a specified pill using system 20 is illustrated. The process begins at start point 202 with the user indicating to application business logic 34 that a new pill canister adapter is desired (stage 204). This may be done by selecting an option within the user interface presented on computer 22 and display 28 or otherwise by application business logic 34, by pressing a dedicated button, or through some other means known to one of skill in the art. In some forms, the user may also be required to input the type of automated pharmaceutical dispensing systems 50 that the pill container is to be produced for, but in use this may be pre-set based upon a known system 50 being used by the user's facility and the type(s) of automated pharmaceutical dispending system(s) 50 known to exist there. In one form, the user then scans the pill (or its packaging or other identifying information) which is to be dispensed by the pill canister adapter being produced (stage 206). This may be accomplished using scanner 30 or some other input device, such as a camera or dedicated scanning or imaging equipment. Alternatively, in other forms, the user may simply input information about the pill, such as its imprints, color, size, shape, UPC number, trademark, name or any other identifying information known to one of skill in the art.

The process shown in FIG. 2 may involve a pill whose dimensions (or exact pill canister adapter design) is already known to system 20, such as by way of database 36. In such an instance, in stage 208, the dimensions of the pill and/or the design of the pill canister adapter for dispensing the pill are provided to the application business logic 34 without further user input. Once the identity of the pill is confirmed as one known within database 36, the process proceeds to stage 218.

In situations where the a pill's dimensions (or exact pill canister adapter design) is not already known to system 20, such as may be the case for new and or less common medications, system 20 is equally able to design and produce a pill canister adapter for dispensing that pill, albeit with more steps involved. In stage 210, in the illustrated form, computer 22 presents on display 28 a series of images of common pill shapes. The user then utilizes touch screen of display 28 to select the shape which most closely resembles the shape of current pill to be dispensed. The shapes displayed may include tablets, capsules and other forms, each of which may be in the form of a bullet, capsule, clover, diamond, double circle, free form, gear, heptagon, hexagon, octagon, oval, pentagon, rectangle, round, semi-circle, square, tear, trapezoid, triangle, or any other shape known to one of skill in the art. In another form, the user may be prompted by computer 22 to answer a series of yes/no questions or the like to define the shape of the pill to be dispensed using a keyboard.

After selecting the shape of the pill, the user next inputs the requested dimensions of the pill in stage 212. Alternatively, these dimensions could be provided by a dimensional scanner or the like, such as may be a capability of scanner 30 or an additional component. In the illustrated embodiment, the computer 22, using application business logic 34, determines which measurements are needed for the selected shape and prompts the user for that information. For example, in the case of a circle, a diameter and height may be all that is required, but for other shapes, such as a rectangle, capsule or an oval—a length, width and height may be necessary. In addition, estimates as to the curvature may also be requested and utilized. In further forms, system 20 may include a traditional set of calipers or an electronic set of calipers operable to communicate with computer 22 for purposes of determining and/or communicating these measurements. One example of a standard set of digital calipers suitable for use with system 20 is the Mitutoyo 500-196-30 Advanced Onsite Sensor (AOS) Absolute Scale Digital Caliper, which is available from Mitutoyo, located at 20-1, Sakado 1-Chome, Takatsu-ku, Kawasaki-shi, Kanagawa 213-8533, Japan. In another form, a calibrated camera system or scanner (such as a laser scanner) may be included within system 20 and provide some or all of these measurements. Once the requested dimensions are determined, the user may provide these to computer 22 and application business logic 34 through user input or they may be provided though other appropriate automated communication means.

Having the shape and dimensions of the pill to be dispensed, the application business logic 34 utilizes, in the illustrated form, logic to select from a plurality of pre-defined pill container shape profiles, which may be stored in database 36 (stage 216). In one form, each pre-defined pill container shape profile provides a design which has some flexibility, but generally is suited for handling a pill or a certain shape and size range. For example, a pre-defined pill container shape profile may apply to round pill having a diameter between 1 and 10 millimeters. Others may be selected based upon the ratio of one dimension to another, such as if the depth to width ratio is between 0.9 and 1.1. Another pre-defined pill container shape profile may apply to capsule shaped pills having a certain size range. A large collection of these pre-defined pill container shape templates provides broad coverage for the majority of all pill shapes and sizes. Each template is also associated with one or more automated pharmaceutical dispensing systems 50, as each of those, depending upon manufacturer, may have different dimensions and characteristics that influence the size, shape and design of the required pill container. In the event of an edge case, an artificially intelligent modelling algorithm may be provided which utilizes the existing pre-defined pill container shape templates to develop a template for the current pill being considered. This algorithm, in the illustrated form, is a genetic algorithm having a pre-defined heuristic for success. In other forms, alternate methods of covering edge cases may be utilized, such as by having the vendor notified by the system 20 and a pre-defined pill container shape template developed manually in an expedited fashion for the new medication. However, the goal of system 20 would be to rarely if ever encounter these by provided broad coverage using the pre-defined pill container shape templates and to provide new templates for new medications which do not match an existing template as they are released.

Once the baseline model or template is selected, the application business logic 34 may adjust the design to accommodate the size of the pill (stage 216). For example, the width of a pill aligning slope may be increased or decreased based upon the dimensions input by the user, or the structure or opening which ultimately delivers the pill from the pill canister adapter may be adjusted in shape, size and/or position. Subsequently, application business logic 34 converts the adjusted design to arrive at a three-dimensional model of the pill canister adapter (stage 218). This is easily permed by a scaling algorithm which scales the relevant components to match the scale of the input dimension of the pill, while working within the confines of the pill container space claim that is required by automated pharmaceutical dispensing systems 50. The resulting three-dimensional model may be presented to the user on display 28 of computer 22 for verification. Subsequently, when confirmed, the three-dimensional model is utilized to develop a set of machine steps, or tool movements, to produce the design. (stage 220). In one form, the design is created from predetermined blank is a plastic disk shaped blank which can be fitted to the rapid development device 40. Blanks may come in various shapes and/or sizes and the one to be loaded will be presented to the user by computer 22. In other forms, such as three-dimensional printing, there may not be a blank as the design is created from the ground up. Finally, the application business logic and/or the rapid development device 40 confirm that the set of tool movements, or instructions for producing the desired pill canister adapter, are workable. For example, certain tool paths that collide with the blank, would not provide sufficient intermediate rigidity or are outside of the operating ranges of the device 40 must be rejected and redone.

With the final production process confirmed, in the illustrated form the user next has to prepare the rapid production device 40 for operation (stage 224). This may include, opening the safety enclosure, attaching the proper blank to the rapid production device 40, attaching the correct tool the device 40, and the like. Alternatively or additionally, a like kind tool change may be required if a wear indicator is tripped by device 40. The rapid production device 40 also includes specific fixturing and sensors to enable the easy and verifiable mounting of the blank therein as well as its proper type and positioning. IT shall be appreciated that these steps would vary in the event the rapid production device 40 were a three-dimensional printer.

In the final step, the rapid production device 40 produces the desired pill canister adapter (stage 226). As described herein, this step may involve milling the pill canister adapter from a blank, three-dimensional printing of the pill canister adapter, some other suitable method or a combination of these methods. Upon completion, the user is prompted to remove the pill canister adapter, clean it, and test it for its intended function. In various forms, the underside of the pill canister adapter may be configured to accept a mounting adapter, which will enable the pill canister adapter to work with the mounting surface within a selected pill canister, as those can vary by manufacturer. This optional mounting adapter allows for retention of the milled pill canister adapter inside the canister body, provides a bearing surface, and transmits the mechanical rotation from the dispensing device to the pill canister adapter as intended. In a further form, a second milling process may be required on this portion of the pill canister adapter to customize it for the selected manufacturer. The process ends at end point 228.

Following the process of FIG. 2, the pill canister adapter is tested to verify functionality. If the canister jams frequently, the tolerances can be increased in the model and another rotor can be made with the new dimensions. Certain profiles have other options (for example, with elongated oval pills, an alternate profile can be used depending on surface roughness that may have better results). If the canister dispenses more pills than requested, an alternate brush can be recommended. If the pills dispense slowly other parameters of the profiles (which control angle and radius of features designed to get pills into dispensing channels) can be adjusted and the rotor can be re-cut.

Figure 3:
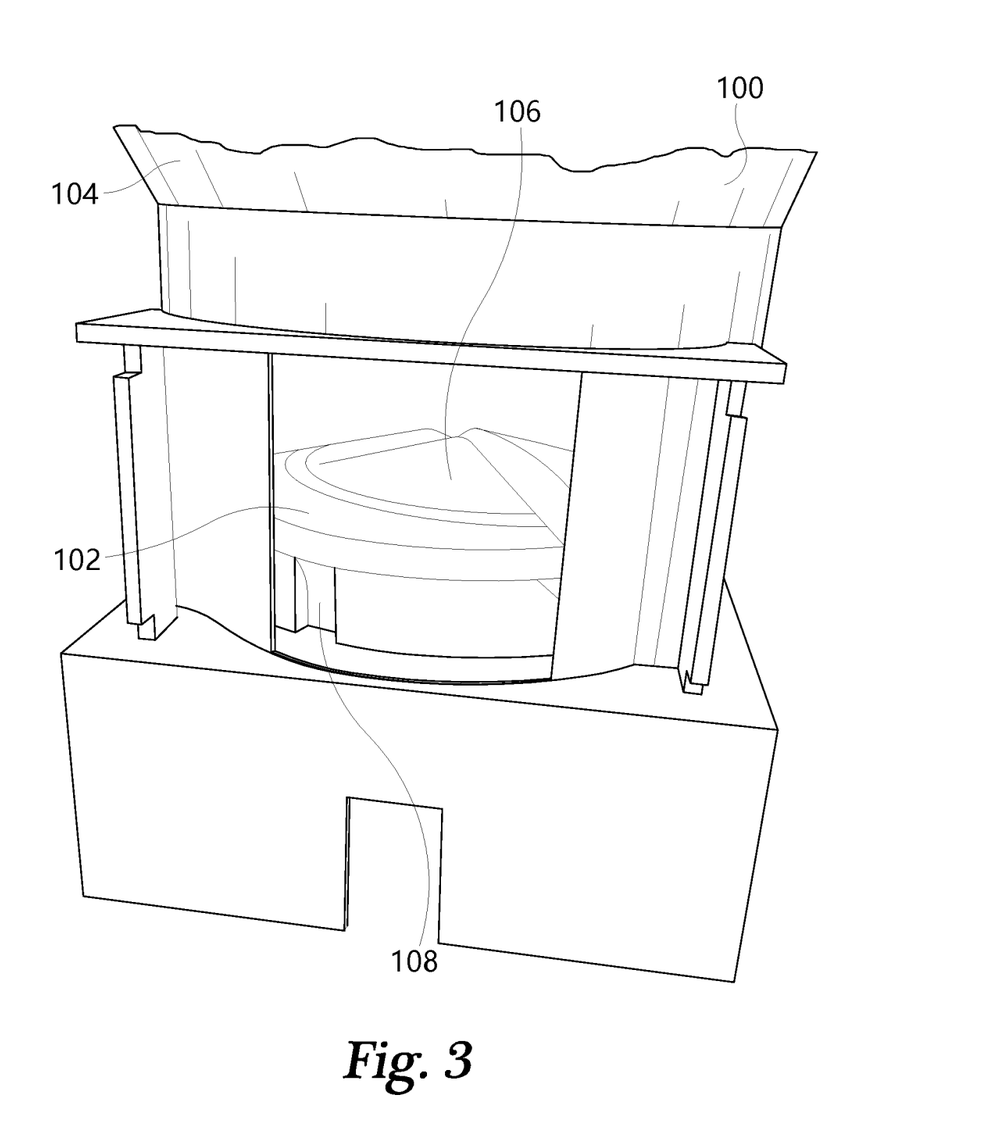
FIG. 3 is a perspective view of a pill canister adapter produced using the system illustrated in FIG. 1 and the process outlined in FIG. 2 as positioned within a pill canister housing.
Figure 4:
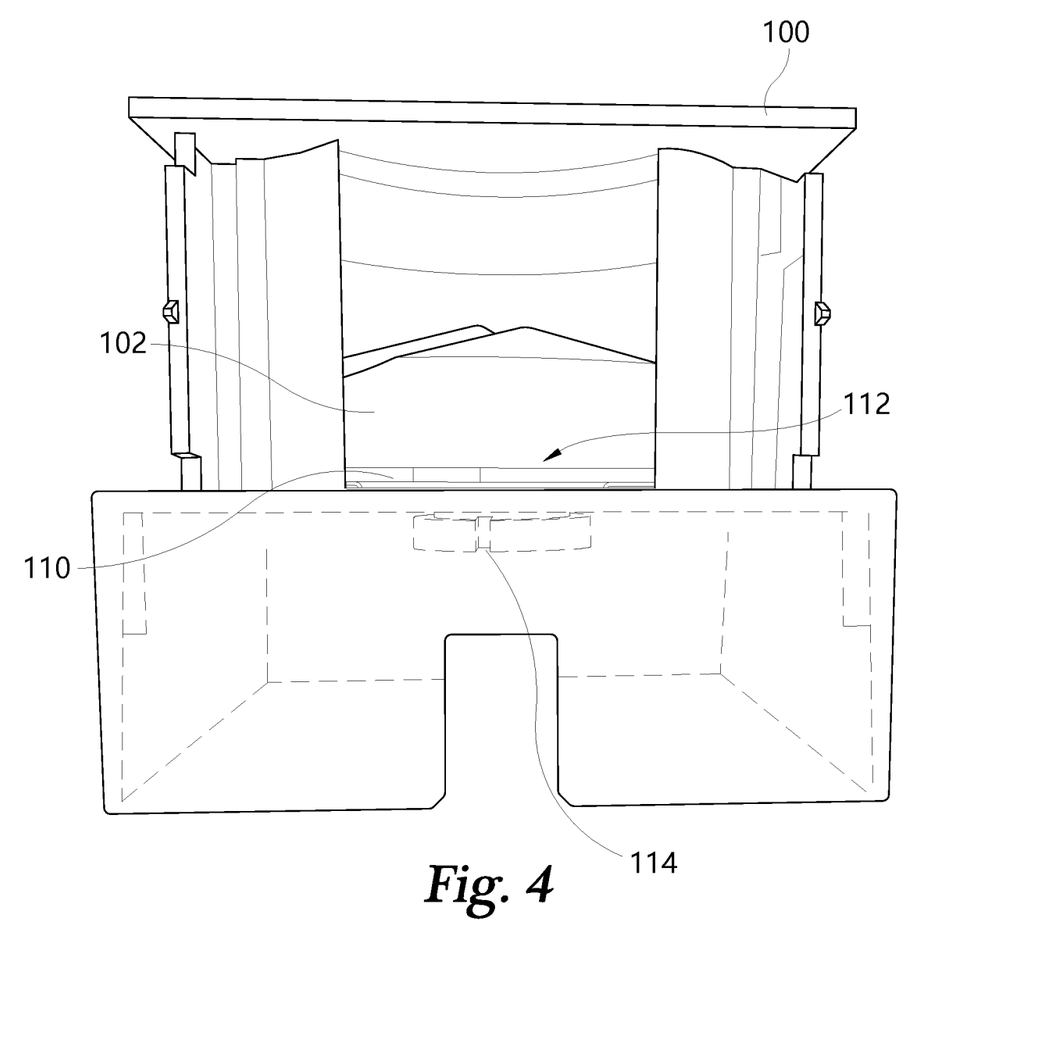
FIG. 4 is a front view of a pill canister adapter produced using the system illustrated in FIG. 1 and the process outlined in FIG. 2 as positioned within a pill canister housing.

In one form, an exemplary pill canister 100 appears in the form shown in FIG. 3, with a partial cut away. The cone structure shown in the center is the pill canister adapter 102 produced by system 20. The outer housing 104 is a standard component for many different sizes and shapes of pills and is supplied by the manufacturer of automated pharmaceutical dispensing system 50. The shape and size, as well as surface treatment of the upper surface 106 of pill canister adapter 102 directs the pills stored above it within pill canister 100 as desired. In addition, grooves and other formations, such as groove 108, further assist in the desired orderly dispensing of pills. As shown in FIG. 4, this portion of the pill canister adapter 102 typically rides on a bearing plate 110 and is rotated (or driven) by a rotor and spline assembly 112 upon which it is mounted. A circlip 114, cotter pin or other mechanism may be used to ensure its attachment. In addition, printer 32 may be utilized to output a label (not shown) for placement on the pill canister adapter to identify its production date, intended medication or the like.

Figure 5:
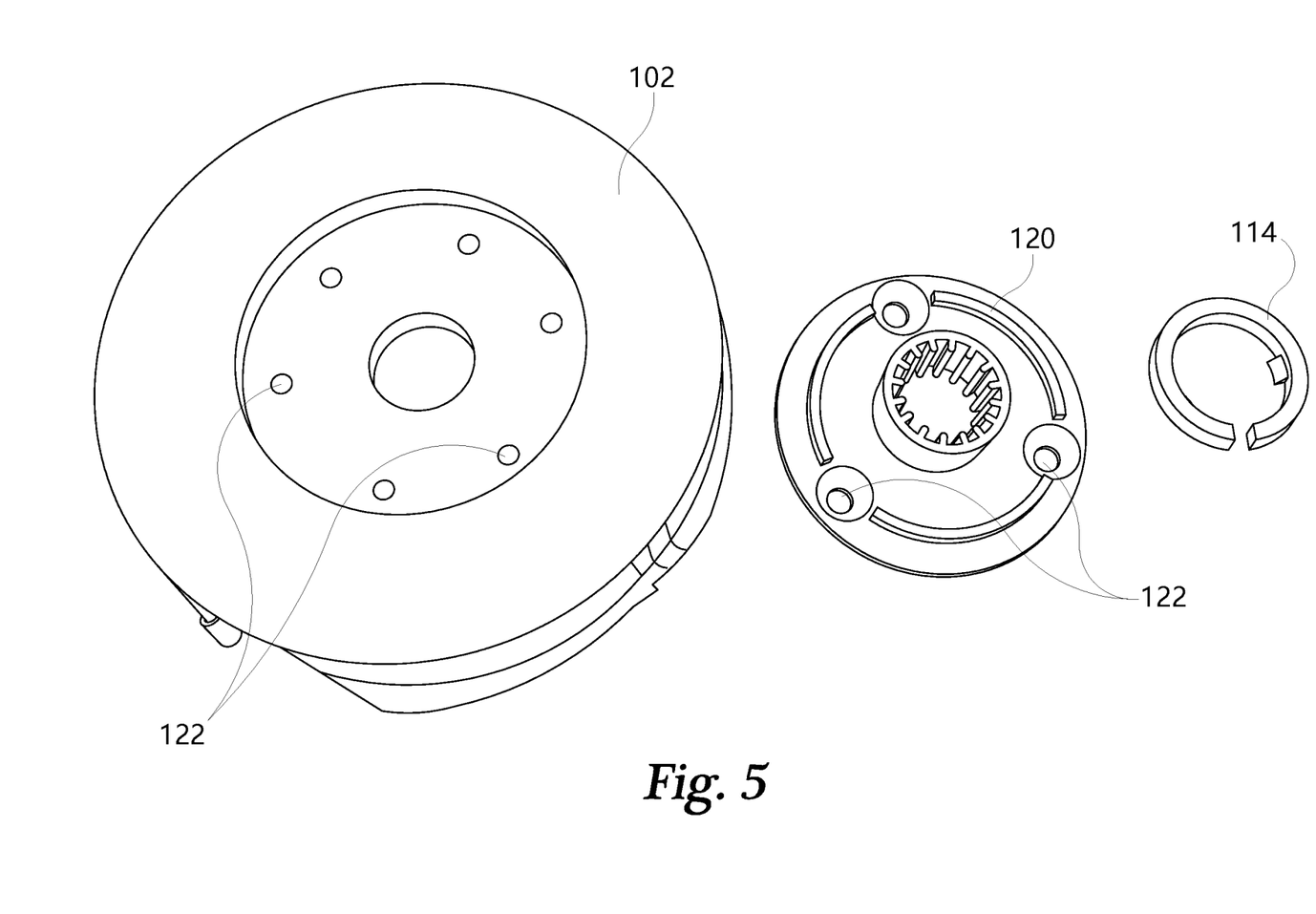
FIG. 5 is a perspective view of a pill canister adapter produced using the system illustrated in FIG. 1 and the process outlined in FIG. 2 outside of a pill canister housing and having its mounting structure separated.

Shown in FIG. 5 is a representative example of the portion of a pill canister adapter 102 produced by system 20. As can be seen, the blank pill canister adapter includes an adapter 120 which enables it to be initially secured to the rapid production device 40 and then subsequently connected to the pill canister, such as by its rotor and spline assembly. This adapter may be secured to the pill canister by screws passing through pathways 122 or other simple attachment means to readily facilitate this transition. In addition, the circlip 114 may be utilized to releasably secure the pill canister adapter 102 to the pill canister (not shown).

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

What is claimed is:

1. A rapid pill canister adapter production system, comprising
    at least one central processing unit;
    a dimension input device in electronic communication with the at least one central processing unit;
    a first database, accessible by the central processing unit, containing a plurality of electronic templates, wherein each electronic template within said plurality of electronic templates contains a first data for a three-dimensional shape of a pill canister adapter and a second data specifying the type and size of pills which the three-dimensional shape may be used with; and
    a rapid production device in electronic communication with the at least one central processing unit;
    wherein the at least one central processing unit is operable to receive a set of specified dimension for a target pill using the dimension input device, select a selected electronic template from within the first database such that the specified dimensions match the second data of the selected electronic template, and determine a set of instructions for the rapid production device to produce a rapid pill canister adapter based on the three-dimensional shape specified by the first data of the selected electronic template.

2. The rapid pill canister adapter production system of claim 1, wherein the rapid production device is a three-dimensional printer or a three-dimensional milling machine.

3. The rapid pill canister adapter production system of claim 2, wherein the rapid production device is a stereolithographic printer.

4. The rapid pill canister adapter production system of claim 2, wherein the rapid production device is a computer numerical control (CNC) milling machine.

5. The rapid pill canister adapter production system of claim 1, wherein the dimension input device is a touchscreen or a keyboard.

6. The rapid pill canister adapter production system of claim 1, wherein the dimension input device is a set of digital calipers.

7. The rapid pill canister adapter production system of claim 1, wherein the dimension input device is a dimensional scanner.

8. The rapid pill canister adapter production system of claim 1, wherein the pill dimension input device is an optical scanner.

9. The rapid pill canister adapter production system of claim 1, wherein the rapid production device is electronically connected to and at least controlled by the least one central processing unit.

10. The rapid pill canister adapter production system of claim 1, wherein the at least one central processing unit is further operable to operate the rapid production device to perform the set of instructions and produce the rapid pill canister adapter.

11. The rapid pill canister adapter production system of claim 1, wherein the at least one central processing unit is further operable to modify the first data of the selected electronic template based upon the electronic input to modify the three-dimensional shape of the pill canister adapter.

12. The rapid pill canister adapter production system of claim 1, wherein the first database further includes a third data indicating a set of compatible pill dispensers for each electronic template.

13. The rapid pill canister adapter production system of claim 12, wherein the at least one central processing unit is further operable receive a specified machine type for dispensing the target pill and subsequently select the selected electronic template from within the first database such that the third data meets the specified machine type.

14. A method for the rapid production of a pill canister adapter, comprising the steps of:

receiving, using at least one central processing unit, an electronic input identifying the shape and at least one dimension of a target pill to be dispensed;

querying a first database, containing a plurality of electronic templates, wherein each electronic template contains a first data for a three-dimensional shape of a pill canister adapter and a second data specifying the type and size of pills which the three-dimensional shape may be used with by using the electronic input to identify a selected electronic template;

determining, using the at least one central processing unit, a set of instructions for a rapid production device to produce a pill canister adapter based on the three-dimensional shape specified by the first data of the selected electronic template; and operating the rapid production device to perform the set of instructions and produce a rapid pill canister adapter.

15. The method of claim 12, further comprising the step of modifying the first data of the selected electronic template based upon the electronic input to modify the three-dimensional shape of a pill canister adapter prior to said operating step.

16. The method of claim 12, further comprising the step of using the at least one central processing unit to electronically communicate the set of instructions to the rapid production device.

17. A rapid pill canister adapter production system, comprising
at least one central processing unit;
an electronic pill dimension measuring device in electronic communication with the at least one central processing unit;
a first database, accessible by the central processing unit, containing a plurality of electronic templates, wherein each electronic template contains a first data for a three-dimensional shape of a pill canister adapter, a second data specifying the type and size of pills which the three-dimensional shape may be used with, and a third data indicating a set of compatible pill dispensers for each electronic template; and
a rapid production device in electronic communication with the at least one central processing unit;
wherein the at least one central processing unit is operable to receive specified dimensions for a target pill from the dimension measuring device and user input indicating a specified machine type for dispensing the target pill, select a selected electronic template from within first database such that the specified dimensions match the second data of the selected electronic template and the third data meets the specified machine type, determine a set of instructions for the rapid production device to produce a rapid pill canister adapter matching the three-dimensional shape specified by the first data of the selected electronic template, and operate the rapid production device to produce a rapid pill canister adapter according to the set of instructions.

18. The rapid pill canister adapter production system of claim 17, wherein the rapid production device is a three-dimensional printer or a three-dimensional computer numerical control (CNC) milling machine.

19. The rapid pill canister adapter production system of claim 17, wherein the at least one central processing unit is further operable to modify the first data of the selected electronic template based upon the electronic input to modify the three-dimensional shape of the pill canister adapter.

20. The rapid pill canister adapter production system of claim 19, wherein the at least one central processing unit modifies the first data of the selected electronic template by scaling at least one component of the selected electronic template.

* * * * *